US008156272B2

(12) United States Patent  
Charrat et al.

(10) Patent No.: US 8,156,272 B2
(45) Date of Patent: Apr. 10, 2012

(54) MULTIPLE COMMUNICATION CHANNELS ON MMC OR SD CMD LINE

(75) Inventors: Bruno Charrat, Provence (FR); Jean-Yves Grall, Jaumegarde (FR); Nicolas Prawitz, Yvette (FR); Roni Kornitz, Sunnyvale, CA (US)

(73) Assignee: Spansion LLC, Sunnyvale, CA (US)

( * ) Notice: Subject to any disclaimer, the term of this patent is extended or adjusted under 35 U.S.C. 154(b) by 977 days.

(21) Appl. No.: 11/469,755

(22) Filed: Sep. 1, 2006

(65) Prior Publication Data

US 2008/0059668 A1    Mar. 6, 2008

(51) Int. Cl.
*G06F 13/00* (2006.01)
(52) U.S. Cl. .................. 710/110; 710/305; 713/600
(58) Field of Classification Search .......... 710/305–306, 710/100, 110; 711/103; 713/600
See application file for complete search history.

(56) References Cited

U.S. PATENT DOCUMENTS

| 4,811,203 | A  | * | 3/1989  | Hamstra       | 711/142 |
| 7,177,975 | B2 | * | 2/2007  | Toombs et al. | 711/103 |
| 2004/0103234 | A1 |   | 5/2004  | Zer et al.    |         |
| 2004/0252566 | A1 | * | 12/2004 | Chang et al.  | 365/202 |
| 2005/0132116 | A1 |   | 6/2005  | Gillet        |         |
| 2006/0005074 | A1 | * | 1/2006  | Yanai et al.  | 714/5   |
| 2007/0079043 | A1 | * | 4/2007  | Yu et al.     | 710/305 |
| 2007/0204077 | A1 | * | 8/2007  | Ootsuka et al.| 710/35  |

OTHER PUBLICATIONS

International Search Report and Written Opinion for International Patent Application No. PCT/US07/018760 dated May 28, 2008, 14 pages.
U.S. Appl. No. 11/469,755, filed Sep. 1, 2006, Reply to Office Action Dated Mar. 12, 2008.
Kingmax Digital Inc: "MMC Card Specification" Aug. 7, 2008 XP002469687, http://www.kingmax.com/products/mc/mmc.htm, Whole Document.

* cited by examiner

*Primary Examiner* — Brian Misiura
*Assistant Examiner* — Kim Huynh
(74) *Attorney, Agent, or Firm* — Turocy & Watson, LLP

(57) ABSTRACT

The claimed subject matter can provide an architecture that interfaces a single slave device such as a UICC smartcard with multiple host controllers. For example, a secondary host can be interfaced between a primary host (e.g. a controller in a cellular phone, a PDA, an MP3 player . . . ) to manage all transactions with the slave device. The secondary host can operate transparently to the primary host and thus does not require any modifications to the primary host. This can be accomplished, e.g. by employing the CMD channel (which is relatively sparsely used by the primary host) to communicate both commands and data with the slave. Moreover, the transactions initiated by the secondary host can be segmented into many smaller fragments and interleaved between transactions initiated by the primary host. In addition, the secondary host can temporarily take on the role of the slave device and affect direct communication with the primary host.

17 Claims, 12 Drawing Sheets

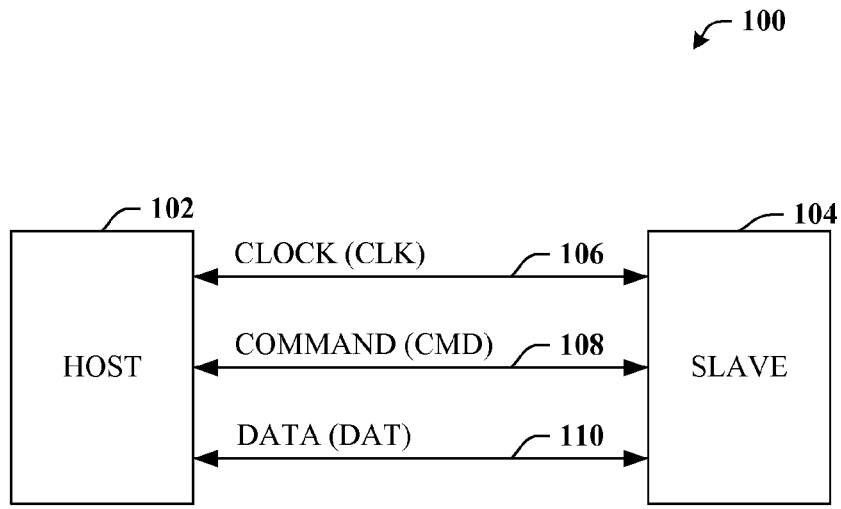
FIG. 1 – PRIOR ART
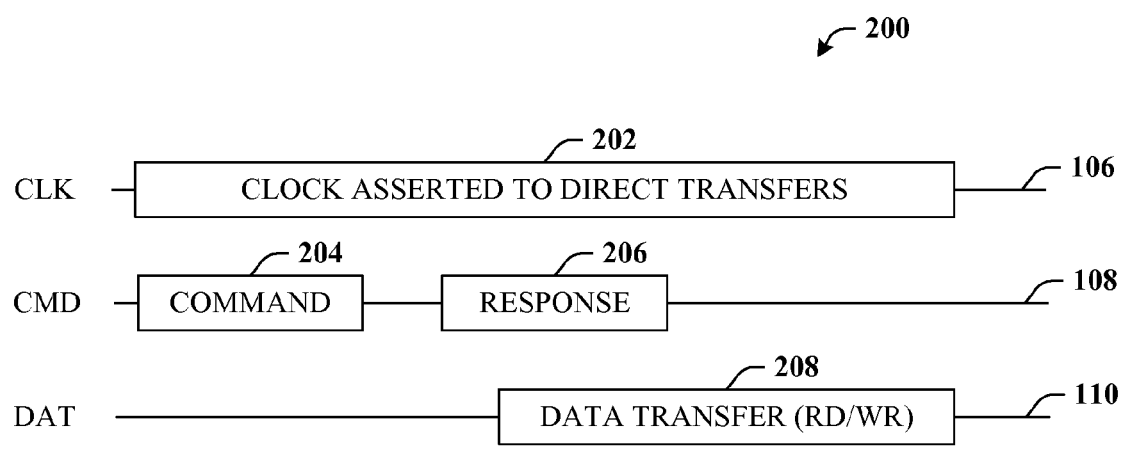
FIG. 2 – PRIOR ART

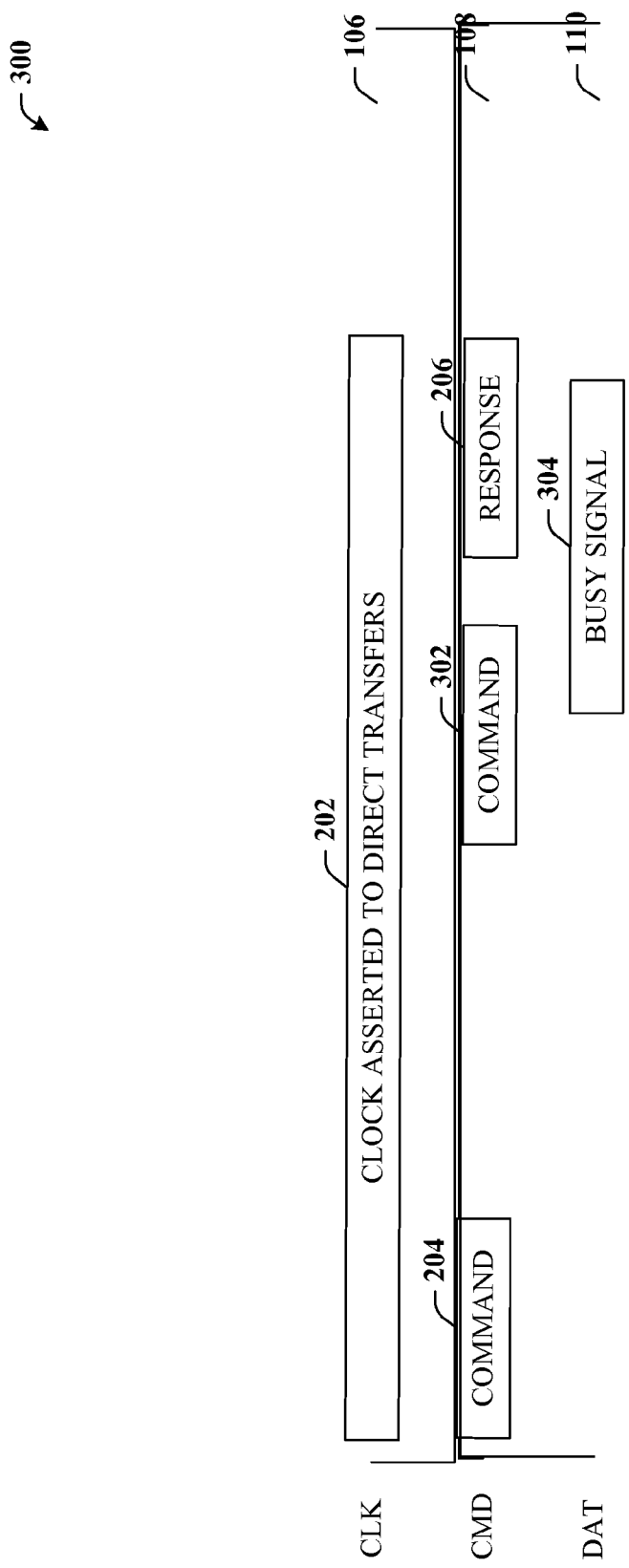
FIG. 3 – PRIOR ART under the subject matter disclosed and claimed

MULTIPLE COMMUNICATION CHANNELS ON MMC OR SD CMD LINE

TECHNICAL FIELD

The claimed subject matter relates generally to providing multiple hosts for a slave device such as a high-density Universal Integrated Circuit Card (UICC) in order to provide additional functionality. More specifically, the claimed subject matter relates to a MultiMediaCard (MMC) or Secure Digital (SD) environment for which a controller (e.g., a host) and, for example, a contactless controller front end (e.g., secondary host), both of which can communicate with the slave device along standard MMC communication channels.

BACKGROUND

As use of and demand for consumer communication devices increases, advancements in size, performance and functionality are constantly being developed and improved. For example, many consumer devices such as cellular phones and the like employ a smartcard to securely store a key identifying a mobile phone service subscriber, as well as subscription information, preferences, text messages, phone book information, etc. Since cell phones operate differently depending upon the underlying technology, different types of smartcards have been developed to interact with the host cell phone.

For instance, Global System for Mobile communication (GSM) networks can employ a Subscriber Identity Module (SIM) card, while Universal Mobile Telecommunication System (UMTS) networks, which utilize Wideband Code Division Multiple Access (W-CDMA), can employ a Universal Subscriber Identity Module (USIM) smartcard. Generally, every smartcard is uniquely identified by its ICCID (International Circuit Card ID) and smartcard users can be identified by storing an IMSI (International Mobile Subscriber Identity). Both SIM and USIM cards can also store network state information such as the current location area identity (LAI). Thus, when the handset is powered up, the device can take data from the smartcard and search for the LAI that was last used. This saves time by avoiding a search of the whole list of frequencies that the telephone would normally use.

Additionally, advances have led to a smartcard that works with both GSM and UMTS networks such as a Universal Integrated Circuit Card (UICC). As with the SIM and the USIM smartcards, the UICC smartcard can ensure the integrity and security of all kinds of personal data, and it typically holds a few hundred kilobytes. In a GSM network, the UICC can call a SIM application and in a UMTS network a corresponding USIM application. Hence, a UICC may contain several applications, making it possible for the same smartcard to give access to both GSM and UMTS networks as described above, and provide for various other applications such as storage of a phone book, etc.

Moreover, in recent years with the advent of the high-density smartcard, the storage capacity has increased dramatically. Today, a typical high-density UICC smart card can house 64 megabytes or more of data, and future cards with greater storage capacity are imminent, thus, further increasing the services and/or applications available for a single smartcard. Generally, a UICC smartcard consists of a CPU, ROM, RAM, EEPROM and I/O circuits. Early versions consisted of the full-size (85×54 mm) smartcard. However, the demand for smaller telephones called for a smaller version of the card, so the card was cropped down to 25×15 mm.

To be of use in the commercial market, smartcards (e.g., UICC) must conform to an accepted fast protocol such that they can communicate with the host device. Two of the most commonly accepted protocols are MultiMediaCard (MMC) and Secure Digital (SD). MMC is an open standard protocol designed for low cost data storage and communication between a host device and an MMC card and/or a smartcard such as those described supra that conforms to the MMC (or SD) standard. The host device can be virtually any device such as a cellular phone, a digital camera, organizers, Personal Digital Assistants (PDAs), digital recorders, MP3 (MPEG-1 Audio Layer-3) players, pagers, electronic toys and games, scanner/readers, etc.

SD is a proprietary standard that has replaced MMC for many popular applications. However, SD is backward compatible with MMC in protocol, topology, and media interface, so an MMC card/chip will generally fit an SD slot and communication between the device and the memory card will be seamless. Both standards target mobile devices with high performance at a low cost, and include features such as low power consumption and high data throughput at the memory card interface.

In a related technological field, many commercial devices employ Radio Frequency Identification (RFID), also known as "contactless" communication. Contactless transactions depend upon an automatic identification/communication method, relying on storing and remotely retrieving data using devices called RFID tags or transponders. An RFID tag is an object that can be attached to or incorporated into a product (etc.) for the purpose of identification using radio waves. Chip-based RFID tags contain silicon chips and antennas. Passive tags require no internal power source, whereas active and semi-passive tags require a power source.

The purpose of an RFID/contactless system is to enable data to be transmitted by a mobile device, called a tag, which is read by an RFID reader and processed according to the needs of a particular application. The data transmitted by the tag may provide identification or location information, or specifics about the product tagged, such as price, color, date of purchase, etc. The use of RFID in tracking and access applications are gaining widespread use. Among the many uses of contactless communication are security gates at the exits of retail stores, libraries and the like, product tracking, quick and convenient transport payment such as for toll roads, subways, etc. access to secure areas and or automobiles, as well as contactless smartcards.

Oftentimes, the data to be communicated during contactless transactions are private identification and account information that is similar or identical to the private information securely stored in smartcards, such as a UICC. However, because conventional smartcards in standard consumer devices are interfaced with a controller that does not provide for contactless transactions, these standard consumer devices cannot make use of their full potential.

SUMMARY

The following presents a simplified summary of the various embodiments in order to provide a basic understanding of some aspects presented herein. This summary is not an extensive overview of the various embodiments. It is intended to neither identify key or critical elements nor delineate the scope of the embodiments. Its sole purpose is to present some concepts in a simplified form as a prelude to the more detailed description that is presented later.

According to the subject matter disclosed and claimed herein, in one aspect thereof, comprises an architecture that can facilitate multiple hosts for a slave device in an environment intended for only a single host, such as an MultiMediaCard (MMC) or Secure Digital (SD) environment. For example, a secondary host can be interfaced between a primary host and the slave device, and operate seamlessly and transparently to the primary host such that no modifications to the primary host is necessary. Moreover, even though the primary host and the secondary host share an interface to the slave device, the secondary host does not require expensive and/or complex multiplexing in order to avoid collisions on the bus/interface lines.

To the accomplishment of the foregoing, the secondary host can be configured to manage transactions with a slave device, and in particular manage signals on a command channel (supported by a clock channel providing timing reference). Generally, the secondary host need not control and/or manage data lines because both commands and data can be communicated with the slave device by way of the command channel. Collisions with transactions initiated by the primary host can be mitigated by employing an arbitration scheme as well as a series of other schemes.

For example, assuming a normal transaction between the primary host and the slave device, the secondary host can simply mirror or transfer the appropriate signals generated on the clock and command buses to the slave device. However, during occurrence of a transaction between the secondary host and the slave device, any transaction issued by the primary host can be simply dropped and/or ignored. This strategy takes advantage of the fact that, in case no response is forthcoming from the slave, the primary host will retry the transaction at a later time. Nevertheless, the primary host generally will not continue retrying the transaction for an indefinite period. Rather, in many situations, the number of retries will be limited before the primary host undertakes further action such as resetting the slave device. Thus, it is sometimes necessary to ensure that use of the command channel is conducted in a timely fashion.

In accordance with one aspect of the claimed subject matter, the secondary host can split a transaction into several fragments of a very small size, such as for example about 4 bytes. Thus, any given communication of these fragments (between the secondary host and the slave device) can be completed much more rapidly than the entire transaction could have been completed. Accordingly, at any given time, it is more likely that the secondary host can adjust to a transaction initiated by the primary host well before the timeout period, then handle the retry command appropriately (e.g., mirror or transfer it to the slave device along the command channel which should now be free). Moreover, in accordance with one aspect, the secondary host can communicate with the slave by limiting the fragment to 4 bytes, which can enable the use of the standard MMC command format, where 4 bytes is the command argument size. In accordance with another aspect, in some situations, it is also possible for the secondary host to issue a busy signal (e.g., on the DAT0 line of the data bus). Although the latter scheme is not necessary, in certain situations, this can be effectively employed to extend the maximum timeout period.

In accordance with yet another aspect of the claimed subject matter, the secondary controller can effectively emulate a slave device. Although the secondary controller might normally only manage the clock and command lines, a connection to the data lines (typically 1-8 data lines, DAT0-DAT7) is also possible (in a cell phone environment, typically a single data line (DAT0) is used). In this case, the primary host can communicate directly with the secondary host (acting as a slave).

The following description and the annexed drawings set forth in detail certain illustrative aspects of the disclosed embodiments. These aspects are indicative, however, of but a few of the various ways in which the principles of the embodiments may be employed and the subject disclosure is intended to include all such aspects and their equivalents. Other advantages and novel features will become apparent from the following detailed description when considered in conjunction with the drawings.

BRIEF DESCRIPTION OF THE DRAWINGS

FIG. 1 illustrates a conventional system wherein a host is interfaced to a slave based upon a MultiMediaCard (MMC) or Secure Digital (SD) communication mode standard, using a single data line (or more than a single data line).

FIG. 2 depicts an exemplary timing diagram for a typical transaction between the host and the slave using MultiMediaCard (MMC) or Secure Digital (SD) communication protocol.

FIG. 3 is a block diagram that depicts an exemplary timing diagram illustrating a command retry and a busy signal.

DETAILED DESCRIPTION

Figure 4:
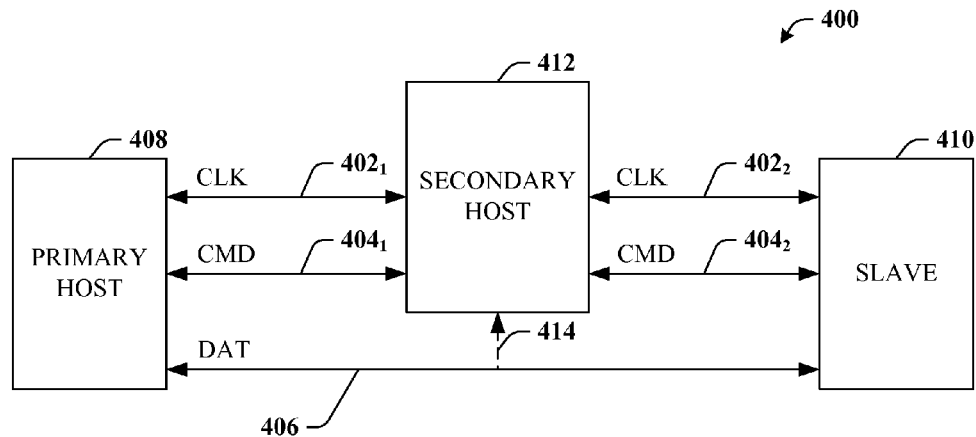
FIG. 4 illustrates a system that facilitates multiple hosts for a slave device in an MMC or SD environment.

The various embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the embodiments may be practiced without these specific details. In other instances, well-known structures and devices are shown in block diagram form in order to facilitate describing the embodiments.

As used in this application, the terms "component," "module," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used herein, the terms to "infer" or "inference" refer generally to the process of reasoning about or inferring states of the system, environment, and/or user from a set of observations as captured by way of events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Inferences can also be based on statistical (e.g., probabilistic or Bayesian) models, fuzzy logic systems, artificial neural nets, or any combination of these.

As used herein, the words "transparent" or "transparently" when used in connection with a secondary host can refer to operation in a manner that does not disturb normal interaction between a primary host and a slave device. For example, a secondary host that operates transparently to the primary host can imply that the secondary host does not unnecessarily interfere with communication between the primary host and the secondary host. Moreover, these terms can mean that the primary host is unaware of the existence of the secondary host and/or that no modification of the primary host is required in order to utilize the secondary host.

As an introduction, the following discussion in connection with FIGS. 1-3 provides a general description of MultiMediaCard (MMC) or Secure Digital (SD) architecture, which can be employed as a base functional unit. This introduction is presented in order to better appreciate novel aspects of various embodiments relating to interfacing a secondary host to both a (primary) host and a slave device as described herein in connection with FIGS. 4-14. In particular, the slave device can be controlled by multiple hosts simultaneously without disturbing normal operation of the primary host and without any hardware or software modifications to the primary host.

Referring now to the drawings, FIG. 1 depicts a conventional system 100 wherein a host 102 is interfaced to a slave 104 based upon, e.g., a MultiMediaCard (MMC) or Secure Digital (SD) communication mode standard. The host 102 is typically a controller in a portable electronic device such as a cellular phone, a digital camera, a Personal Digital Assistants (PDA), or the like. The slave 104 is typically a mass media storage device such as a smartcard, but the MMC (and similarly the SD) specification provides for several card classes that can differ in the functions they provide. For instance, the slave 104 can be a Read Only Memory (ROM) card, a Read/Write (RW) card, or an Input/Output (I/O) card. ROM cards are generally manufactured with fixed data content. They are typically used as a distribution media for software, audio, video etc. RW cards, e.g. Flash, One Time Programmable (OTP), and/or Multiple Time Programmable (MTP) are typically sold as blank (empty) media and are used for mass data storage, end user recording of video, audio or digital images. I/O cards are intended for communication (e.g., modems) and typically will have an additional interface link.

Regardless of the type, slave 104 can be connected directly to the signals of the MMC (or SD) bus, and any communications between the host 102 and the slave 104 are based on a 5- to 13-pin bus structure. The communication protocol is defined as a part of the respective standard and referred to as MMC or SD mode. To ensure compatibility with existing controllers (e.g., host 102), the slave 104 may offer, in addition to the MMC (or SD) mode, an alternate communication protocol that is based on the Serial Peripheral Interface (SPI) standard.

The 5-13 pin bus may includes three power supply lines, $V_{SS1}$, $V_{SS2}$, and $V_{DD}$ (not shown), as well as a clock channel (CLK) 106, a command channel (CMD) 108, and an 1-8 line data channel (DAT) 110. The CLK 106 directs a one-bit transfer on the CMD 108 and on all the DAT 110 lines. The frequency may vary between zero and the maximum clock frequency for the particular device. The CMD 108 channel is a bidirectional command channel used for card initialization and transfer of transactions between the host 102 and slave 104. The CMD 108 line has two operation modes: open-drain for initialization mode, and push-pull for fast transaction transfer. Generally, commands that relate to transactions are sent from the host 102 to the slave 104 and responses are sent from the slave 104 to the host 102.

DAT 110 includes one to eight bidirectional data channels, DAT0-DAT7, which operate in push-pull mode. The slave 104 includes internal pull ups for all data lines, and only the slave 104 or the host 102 can be driving these signals at any given time. By default, after power up or reset, only DAT0 (e.g., mode 1) is used for data transfer. However, a wider data bus can be configured by the host 102 for data transfer, using either DAT0-DAT3 (e.g., mode 2) or DAT0-DAT7 (e.g., mode 3). Thus, the host 102 and the slave 104 can exchange data (e.g. read or write) 1 bit, 4 bits, or 8 bits at a time.

While still referring to FIG. 1 but with reference also to FIG. 2, an exemplary timing diagram 200 for a typical transaction between the host 102 and the slave 104 is illustrated. The timing diagram 200 shows the CLK 106, the CMD 108 and the DAT 110 lines. When the host 102 desires to engage in a transaction with the slave 104, the host asserts the CLK 106 channel to synchronize the bit transfers on the CMD 106 and DAT 110 lines, as block 202 illustrates. The transaction will typically involve a command token 204, which is transmitted along the CMD 108. In response, the slave 104 will generally issue a response token 206, which is also transmitted by way of CMD 108. If, as depicted here, the transaction includes a data token 208, then the data transfer between the host 102 and the slave 104 will ensue on one or more of the DAT 110 lines.

As described, data transfers along the DAT 110 can make use of one line, four lines or all eight lines depending upon the mode. In addition, data transfer commands can be effectuated as sequential commands or block-oriented commands. Sequential commands initiate a continuous data stream, and they are terminated only when a stop command (e.g., command 204) follows on the CMD 108 line. This mode reduces the command overhead. Block-oriented commands send a data block succeeded by CRC (Cyclical Redundancy Check) bits. Both read and write operations allow either single or multiple block transmission. A multiple block transmission is terminated when a stop command follows on the CMD 108 line similar to the sequential read.

Still referring to FIG. 1, but turning also to FIG. 3, an exemplary timing diagram 300 illustrating a command retry and a busy signal is depicted. As before, the CLK 106 is asserted to direct transfers as shown by block 202. The host 102 transmits the command 204 on the CMD 108, but in this case, slave 104 does not respond for some reason. If, as here, there is no response from the slave 104, the host 102 will generally wait a certain period of time before retrying the command. Typically, this period of time (e.g. a timeout) is about 64 clock cycles after the command 204 is completed. Thus, if the period of no response exceeds about 64 clock cycles, the host 102 will timeout the transaction and retry the command as illustrated by command retry 302.

Although not shown, most conventional controllers (e.g., host 102) will retry the command 204 at least twice (e.g., send one command 204, followed up by two retry commands 302 if no response is received). That is, common controllers will assume there was an error in the transmission of the command 204 and retry it without necessarily attempting to determine the nature of the error or take any other action. Therefore, assuming the command 204 requires about 50 clock cycles to complete, the slave 104 has approximately 228 clock cycles before the last retry command 302 is transmitted and about 50 clock cycles after which it must respond. If the response 206 to the retry command 302 is not received within this period, the transaction will generate an error, which may cause the host 102 to initiate a reset of the slave 104. Alternatively, the slave can assert a busy signal 304 on the DAT0 line of the DAT 110 bus to inform the host 102 that the slave 104 is busy and cannot process the transaction. If a busy signal 304 is generated, then the host 102 will not attempt to send a retry command 302 and the transaction will not time out. However, the host 102 can deselect the slave 104 to prevent it from tying up the DAT 110 bus. Depending upon the device/host controller, the busy signal 304 may or may not prevent the host 102 from initiating a reset of the slave 104 in the event of a timeout after the last retry command 302.

With reference now to FIG. 4, a system 400 that facilitates multiple hosts for a slave device in an MMC or SD environment is illustrated. Generally, the system 400 can include an interface with a clock channel (e.g., CLK $402_1$ and $402_2$, which may be referred to herein either individually or collectively as CLK 402), a command channel (e.g., CMD $404_1$ and $404_2$, which may be referred to herein either individually or collectively as CMD 404), and a data channel (e.g. DAT 406). The interface can be substantially similar or identical to the MMC or SD standards described above. As such, the interface can conform to MMC or SD standards and protocols, wherein a host (e.g., primary host 408) communicates with a slave (e.g., slave 410) by way of the interface.

The primary host 408 can therefore be a controller for any device type suitable for MMC (or SD) transactions such as, for example, a cellular phone, a digital camera, an organizer, a PDA, a digital recorder, an MP3 (MPEG-1 Audio Layer-3) player, a pager, an electronic toy, an electronic game, a scanner/reader, or another device. Similarly, the slave 410 can be any suitable mass storage device such as a smartcard, a Subscriber Identity Module (SIM) card, a Universal Subscriber Identity Module (USIM), a Universal Integrated Circuit Card (UICC), an MMC card, an SD card, etc.

In addition, the system 400 can also include a secondary host 412 that is operatively coupled to the interface in between the primary host 408 and the slave 410. Generally, the secondary host 412 can be situated between the primary host 408 and the slave 410 for the CLK 402 and the CMD 404 channels, but otherwise leaves the DAT 406 channel uninterrupted for direct communication between the primary host 408 and the slave 410. However, the secondary host 412 can be optionally linked to the DAT 406 channel as shown by the line 414, which will be described infra.

The secondary host 412 can provide additional functionality depending upon its nature. For example, the secondary host 412 can be a contactless front end controller (or some other device) that can communicate with the slave 410 independently (and/or transparently) to the primary host 408. Thus, the primary host 408 need not even be aware of the existence of the secondary host 412, and can engage in transactions with the slave 410 as designed without any modifications to the hardware, software, firmware, standard, or protocol of the primary host 408. Additionally or alternatively, the secondary host 412 can also transact with the primary host 408 by, for example, temporarily emulating a slave 410, which will also be described infra.

In accordance with the foregoing, the secondary host 412 can communicate with the slave 410 by utilizing only the CLK $402_2$ and CMD $404_2$ channels. For example, the secondary host 412 can employ only a subset of commands available to the primary host 408 such as those commands that do not include data tokens and/or make use the DAT 406 bus. Rather, the secondary host 412 can communicate both commands and data by way of the bidirectional CMD $404_2$ channel. While such an approach may require modifications to the slave 410, such modifications can be implemented entirely by software, and no modifications whatsoever are required for the primary host 408. Moreover, in transactions between the primary host 408 and the slave 410, the CMD 404 channel is used relatively infrequently when compared to the CLK 402 and DAT 406 lines. Therefore, the CMD 404 channel provides a very effective means for the secondary host 412 to engage in transactions with the slave 410 without interfering with the normal operation of the primary host 408.

Figure 5:
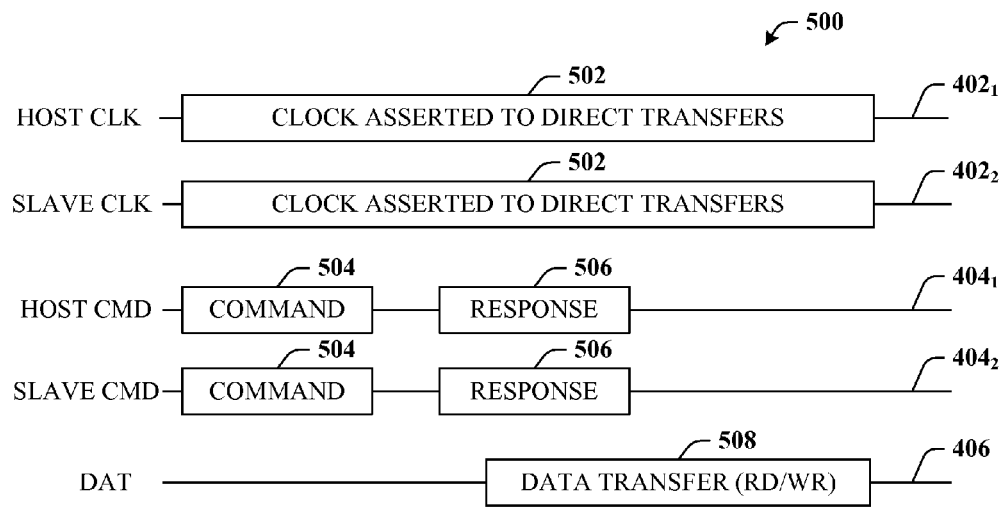
FIG. 5 is an exemplary timing diagram for the system that facilitates multiple hosts for a slave device.

By way of illustration, turning now to FIG. 5 (while still referencing FIG. 4), an exemplary timing diagram 500 for the system 400 is depicted. The timing diagram 500 illustrates a typical transaction between the primary host 408 and the slave 410 with no other transactions occurring. As with conventional systems, the primary host 408 begins by asserting the CLK $402_1$ line to direct communication on the other lines as depicted by block 502. This communication is passed along or mirrored by the secondary host 412 to the slave 410 along CLK $402_2$. Similarly, the secondary host 412 mirrors the corresponding command 504 that is issued by the primary host 408 along the CMD $404_1$ line to CMD $404_2$ such that the slave receives the command 504 just as it would in conventional systems such as that described in FIGS. 1 and 2.

The slave 410 issues a response 506 along the CMD $404_2$ channel and the secondary host 412 passes the response 506 to the primary host 408 by way of CMD $404_1$. In the case, where data is to be transferred between the primary host 408 and the slave 410, the data transfer 508 occurs along the DAT 406 channel or channels as it normally would in the case where there was no secondary host 412. Accordingly, while the secondary host 412 can manage any or all signals along the CLK 402 and CMD 404 channels, in most cases the secondary host will simply be mirroring the commands/responses of the primary host 408 and the slave 410. However, there exists the potential for collisions along the CLK 402 and CMD 404 channels such as when both the primary host 408 and the secondary host 412 want to utilize the CMD 404 line at the same time. These and other situations as well as solutions to any difficulties that arise will be described in more detail infra.

Figure 6:
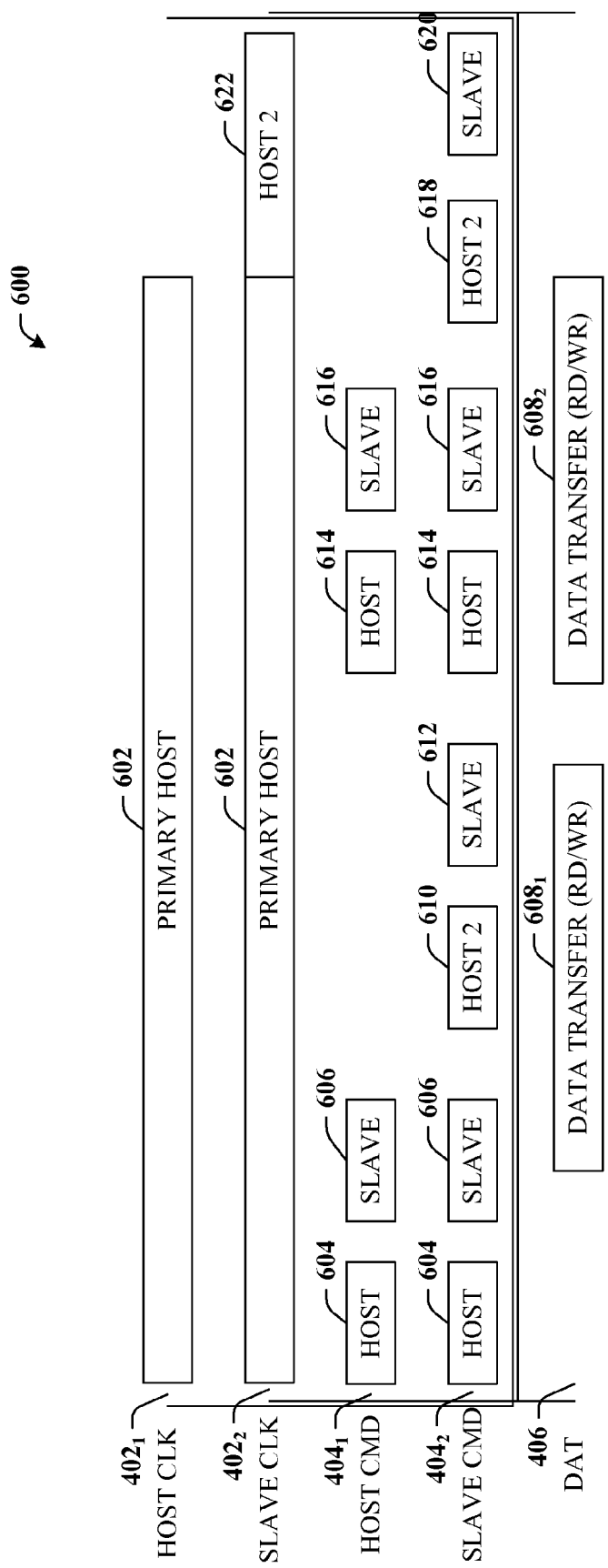
FIG. 6 is an exemplary timing diagram showing simultaneous communication with the slave by both the primary host and the secondary host.

While still referring to FIG. 4, but turning to FIG. 6 as well, an exemplary timing diagram 600 showing simultaneous communication with the slave 410 by both the primary host 408 and the secondary host 412 is illustrated. Generally, as block 602 shows, the primary host 408 engages the CLK $402_1$, which the secondary host reflects to CLK $402_2$, allowing bits to be synchronized at the slave 410. The primary host 408 sends a command 604, which is also mirrored to the slave 410 by the secondary host 412, as is the response 606 sent by the slave 410. As a result of the command 604, a data transfer may be requested such as a data read, data write, etc. as depicted by data transfer blocks $608_1$ and $608_2$.

As previously described, data transfer 608 along the DAT 406 channels could be either sequential commands or block-oriented commands. However, in either case, the CMD 404 line is not typically being utilized during data transfers 608. As such, the secondary host 412 can make use of these (and other) dormant periods with respect to the CMD 404 channel by executing transactions of its own with the slave 410. That is, the secondary host 412 can interleave commands to the slave 410 with commands from the primary host 408 as timing diagram 500 illustrates. While data transfer $608_1$ is occurring, the secondary host 412 transmits command 610 to the slave 410 along CMD $404_2$, and the slave 410 responds on CMD $404_2$ with response 612.

Subsequently, the primary host 410 is free to send other commands and receive responses such as command 614 and response 616, which the secondary host 412 can dutifully mirror to the slave 410 and the primary host 408, respectively. Once the transactions between the primary host 408 and the slave 412 are complete (which in this case occurs at the end of data transfer $608_2$), the primary host 408 will often terminate the activity on the CLK 402 channel as well. Thus, if the secondary host 412 still has outstanding transactions, as here in the case of command 618 and response 620, the secondary host 412 may take over the operation of CLK $402_2$ and assert the signal over this line, as illustrated by block 622.

It is to be appreciated that this and other timing diagrams herein are not drawn to scale or intended to provide for precise timing. Rather, they are intended to readily convey the concepts necessary for understanding features of the claimed subject matter. It is to be further appreciated that concepts used and described herein are not limited only to situations in which the secondary host 412 can only communicate with the slave 410 when the primary host 408 is not attempting to use CMD 404. Rather, potential collisions can be handled in various other ways as detailed below with reference to FIGS. 7-10.

Figure 7:
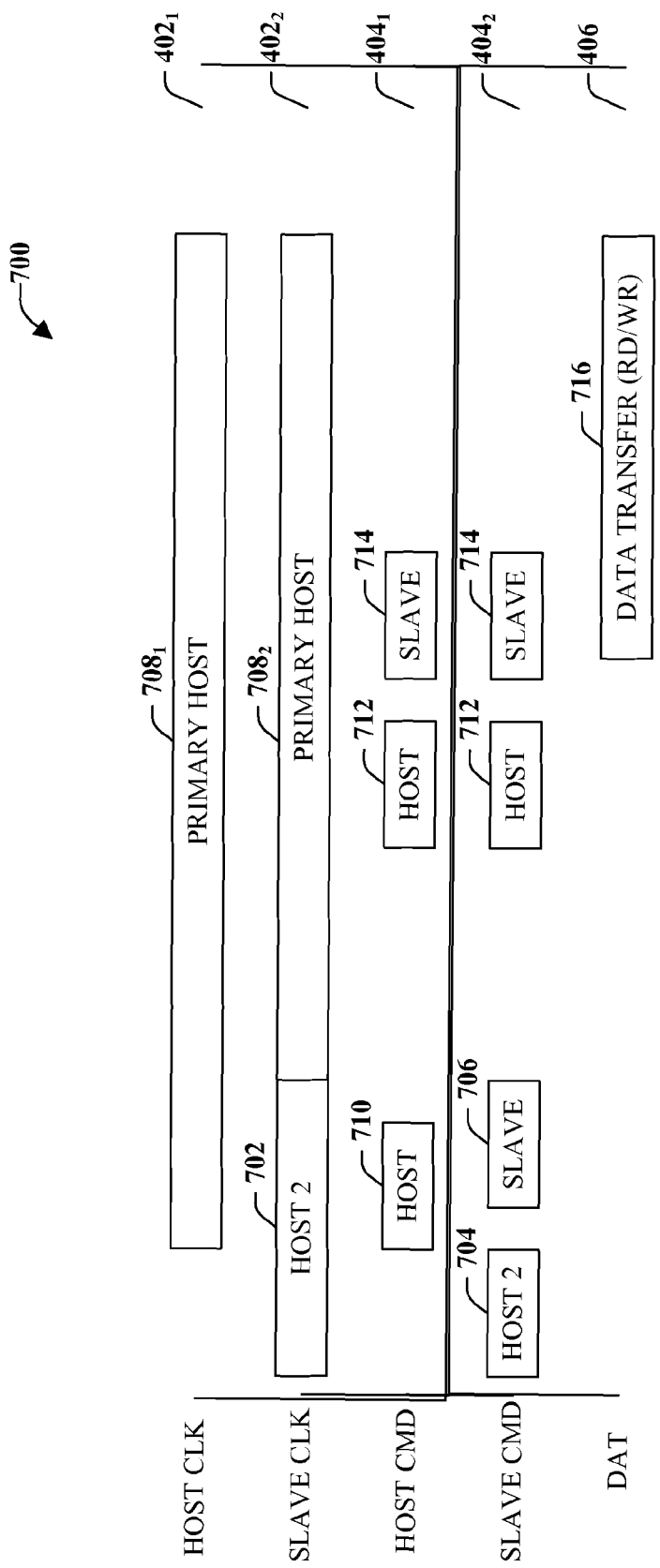
FIG. 7 is a block diagram of an exemplary timing diagram for the case in which the primary host initiates a command to the slave while CMD is in use by the secondary host.

Turning now to FIG. 7, an exemplary timing diagram 700 for the case in which the primary host 408 initiates a command to the slave 410 while CMD 404 is in use by the secondary host 412 is depicted. Block 702 indicates that the secondary host 412 has asserted CLK $402_2$ in order to direct the information exchange with the slave 410. The secondary host 412 transmits a command 704 on CMD $404_2$ and the slave 410 responds with response 706. Some time during the transaction (e.g., during command 704 and/or response 706), the primary host 408 asserts CLK $402_1$ as indicated by block $708_1$ and transmits command 710 on CMD $404_1$. In this case, the secondary host 412 can simply ignore and/or drop the signals from the primary host 408 on the CMD 404 and CLK 402 lines, relying on the fact that the primary host 408 will retry (e.g., command retry 712) the command 710 at a later time, as detailed supra with respect to FIG. 3.

More specifically, in the case of command 708, the secondary host 412 does not mirror the command to CMD $404_2$, and likewise may not mirror the signals on CLK $402_1$. Assuming, as is the case here, that the transaction (e.g., signals 704 and 706) are relatively brief such that they can be completed before one or a few retries 712, then any transaction between the secondary host 412 and the slave 410 can be effectuated without unduly disturbing the normal operation of the primary host 408. This applies even when both events occur during the same time, as depicted. Accordingly, once the transaction between the secondary host 412 and the slave 410 is completed, control of CLK 402 can be returned to the primary host 408 and the secondary host 412 can appropriately mirror retry command 712 and the corresponding response 714 from the slave 410. Additionally, data transfer 716 can also occur normally between the primary host 408 and the slave 410.

Figure 8:
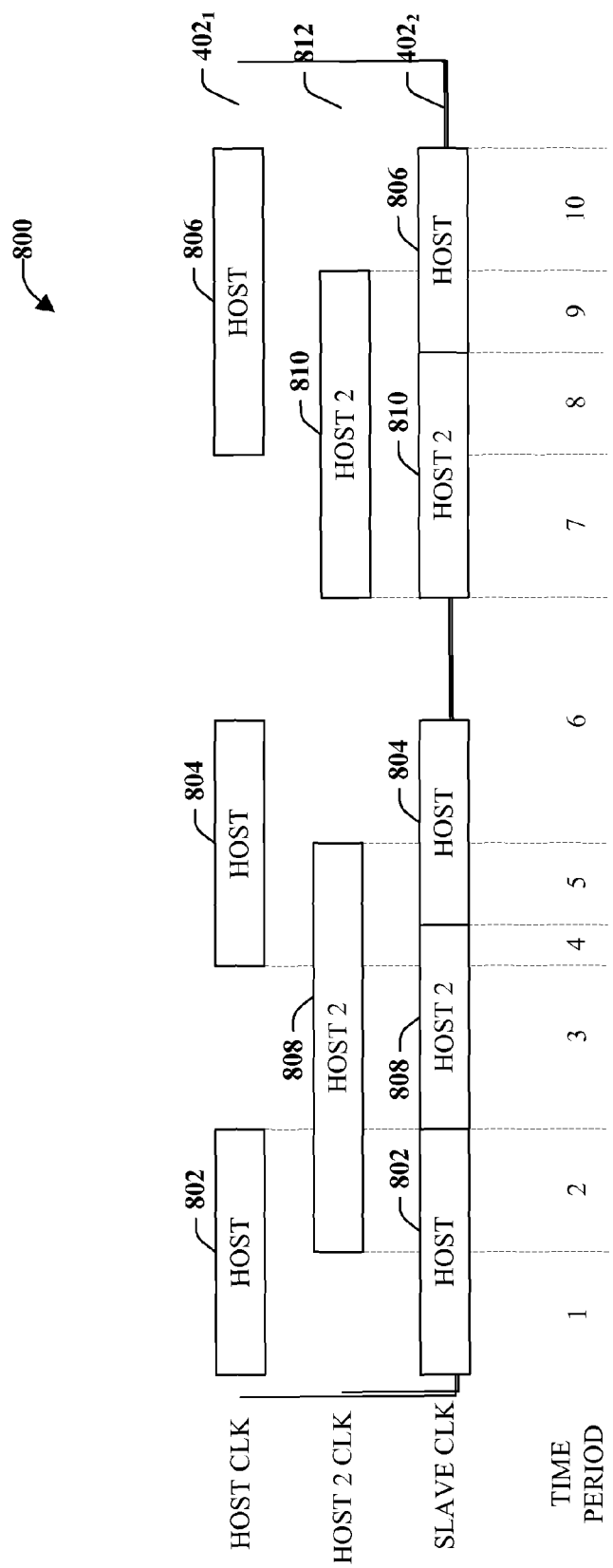
FIG. 8 is a block diagram illustrating an exemplary timing diagram for various CLK representations.

Turning now to FIG. 8, an exemplary timing diagram 800 for various CLK 402 representations is illustrated. Generally, the CLK 402, line can be asserted by the primary host 408 such as depicted by blocks 802-806. In most cases, the secondary host 412 will mirror these signals to CLK $402_2$ as previously described. Assuming there are no transactions occurring between the primary host 408 and the slave 410, the secondary host 412 may assert the CLK 402 as depicted by blocks 808 and 810 on hypothetical CLK line 812. However, since the secondary host 412 can sometimes arbitrate use of the CMD 404 channel, it can also arbitrate use of the CLK 402 channel.

FIG. 7 detailed a situation in which the primary host 408 attempted to conduct a transaction with the slave 410 during a previously initiated transaction between the secondary host 412 and the slave 410. In timing diagram 800, the reverse is true at the outset. As the diagram 800 illustrates at time period 1, the primary host 408 is controlling the CLK 402, but before the transaction is complete, the secondary host 412 desires to initiate a transaction with the slave 410 at time period 2. In this case, the secondary host 402 will typically wait until the primary host 408 transactions are finished before taking control of the CLK 402 line. However, it should be appreciated that if the primary host 408 is not making use of the CMD 404 line during time period 2, then transactions could be occurring between the secondary host 412 and the slave 410, employing the primary host 408 signal on the CLK 402 line to direct bit transfers. If the primary host 408 is using CMD 404 during time period 2, then the secondary host 412 will typically wait so as not to interfere with the primary host 408.

As illustrated, and because the claimed subject matter can rely upon interleaving transactions during very time sensitive operations, the signal seen by the slave 410 on the CLK $402_2$ channel can be operated by different hosts (e.g. the primary host 408 and the secondary host 412) in rapid succession if need be. Accordingly, the secondary host 412 can be equipped with an algorithm to handle host clock selection, insuring reliable communication with the slave 410. Hence, to summarize, the primary host 408 clock is used on the CLK 402 as the slave 410 clock such as during time periods 1, 6, and 10. In cases where the secondary host 412 begins a transaction while the primary host 408 clock is "on", the primary host 408 clock is used as the slave 410 clock such as during time period 2. However, in cases where the primary host 408 clock is "off" or about to become "off", the slave 410 clock (e.g. CLK $402_2$) is switched to control by the secondary host 412, such as during time periods 3 and 7. Finally, there are cases in which the primary host 408 clock becomes "on" while the secondary host 412 is conducting a transaction with the slave 410. In such instances, the slave 410 clock need not be switched to the primary host 408 clock until the original communication session with the secondary host 412 has been completed (e.g., after the slave 410 has transmitted a response command on CMD 404), such as the transitions between time periods 4-5 and 8-9.

With the foregoing in mind regarding the CLK 402 arbitration, and referring back to FIG. 4, a more detailed explanation can now be provided for the arbitration of the CMD 404 channel. As discussed, the secondary host 412 can interleave commands to the slave 410 rather than being forced to employ complex/expensive multiplexing for time-sharing the respective channels. The main difficulty with this approach is, as described with reference to FIG. 3, the relatively short maximum response time before a timeout (e.g., 64 clock cycles) and the few number of retries when no response is elicited (typically 2 or 3). Accordingly, when the secondary host 412 commandeers the CMD 404 channel while the primary host 408 is attempting to do the same, the transactions between the secondary host 412 and the slave 410 must be very time sensitive.

One solution to this difficulty is to employ a busy signal (e.g., busy signal 304 from FIG. 3) to extend the length of time the slave 410 has before it must respond to a command from the primary host 408. However, in some cases, busy signaling will not create this desirable effect (as will be described below). Therefore, another solution is to ensure the transactions between the secondary host 412 and the slave 410 are very short in duration. This can be accomplished by segmenting the transactions into multiple fragments and transmitting fragments of a transaction to the slave 410 individually. For example, in the case where the secondary host 412 is a contactless front end, RFID token information can be transferred using the application-specific command prefix followed by an application specific command carrying, e.g., a 4-byte fragment of token information. It is to be appreciated that a contactless front end is merely exemplary, and other secondary host 412 devices are envisioned. These relatively small fragments can be interleaved between primary host 408 transactions as described above in a very non-invasive manner.

For instance, a 128-byte transfer (using 4-byte fragments) would require no less than 200*32=6400 clock cycles, which at, e.g., 26 MHz=246 ms. In the situation where the primary host 408 is an MMC- or SD-type controller a review of the respective specifications provides relevant information about timeout values for a response to a command issued by the primary host 408. The MMC System Specification 4.1 declares at paragraph 4.6.2, that at no time should a timeout condition last for more than 10*R2W_FACTOR*TAAC (102.4 second maximum) for write/erase operations and 10*TAAC (800 ms) for read operations. Busy signaling (e.g., busy signal 304 from FIG. 3) can extend this; however, no overriding maximum timeout value is stated.

The SD 1.10 System Specification states at paragraph 4.6.2 that at no time should a timeout condition last for more than 100*R2W_FACTOR*TAAC or 250 mS (whichever is less) for write/erase operations and 100*TAAC or 100 mS (whichever is less) for read operations. If this time is exceeded the controller (e.g., primary host 408) is at liberty to reset, power cycle or reject the card (e.g., slave 410).

The SD 2.00 System Specification Draft is clearer in this respect stating at paragraph 4.6.2.2, the host should use 100*R2W_FACTOR*TAAC or 250 mS (whichever is less) as the minimum timeout value for write operations (this includes writes using busy signaling) and 100*TAAC or 100 mS (whichever is less) as the minimum timeout for read operations (busy signaling is unlikely to occur during read transactions).

Thus, to be compliant across all specifications, the minimum timeout value for the completion of a transaction is 10*R2W_FACTOR*TAAC or 250 ms (whichever is less) for a write operation; and 10*TAAC or 100 mS (whichever is less) for a read operation, and the use of a busy signal is not helpful in extending these times. However, the fragmented interleaving approach provides an effective solution, as can be seen with reference to FIG. 9.

Figure 9:
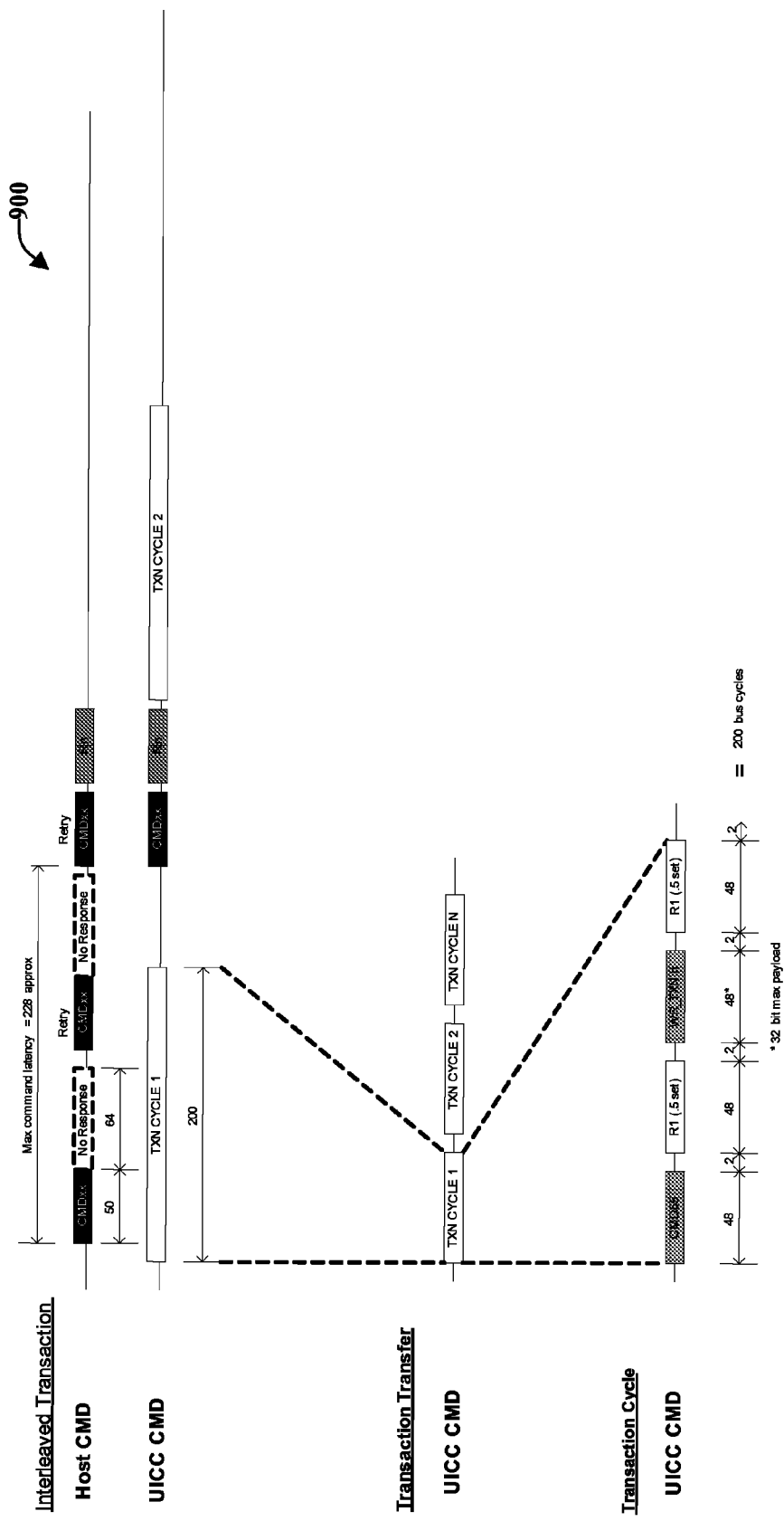
FIG. 9 is a block diagram illustrating an exemplary timing diagram that interleaves transactions to a UICC device along the CMD bus.

Turning now to FIG. 9, an exemplary timing diagram 900 that interleaves transactions to a UICC device along the CMD bus is illustrated. Generally, a transaction between a secondary host can be fragmented into several transaction cycles (e.g. TXN Cycle 1, 2 . . . N), each of about 4 bytes in length. Shortly thereafter, a command (e.g., CMDxx) can be sent from the primary host to which there is no response. As depicted, the primary host retries the command two times before TXN Cycle 1 is fully complete and the UICC smartcard is able to respond (e.g., Rn). After the response, the CMD line may be free once more for other fragments of the transaction to be delivered to the UICC from the secondary host as illustrated by the TXN Cycle 2 transaction on the UICC CMD line.

It is to be appreciated that the use of a 4-byte fragment (e.g., TXN Cycle 1, 2 . . . N) is merely exemplary and other sizes are considered to be within the spirit and scope of the claimed subject matter. However, a 4-byte fragment can enable the use of the standard MMC command format, where 4 bytes is the command argument size, and therefore provides a very convenient solution for a number a reasons. First, if a larger size is used, non-standard command types would be forced to presume that the slave has a large enough command buffer to accommodate such commands and sufficient code space to parse non-standard commands. Secondly, some hardware interfaces (e.g., MMC/SD) are designed only to handle a rigid command/response structure. Third, entertaining proprietary command formats could preclude using an open standard controller (e.g., an MMC controller) or other proprietary controllers (e.g., SD controllers), which could complicate the secondary host due to added bus control logic, etc. Finally, transferring data in small (e.g., 4 byte) fragments lends itself well to the interleaved approach.

It is to be further appreciated and understood that the foregoing is merely intended as an example and should not be considered as a limitation to the applications of the claimed subject matter. For example, the slave device need not be a UICC smartcard and/or full MMC and SD compliance may not be necessary. As a consequence, there exists environments and applications in which busy signaling can be used in addition to (or alternatively to) the fragmented interleaved command approach described herein. A concise explanation of the busy signaling approach can be found supra with reference to FIG. 10.

Figure 10:
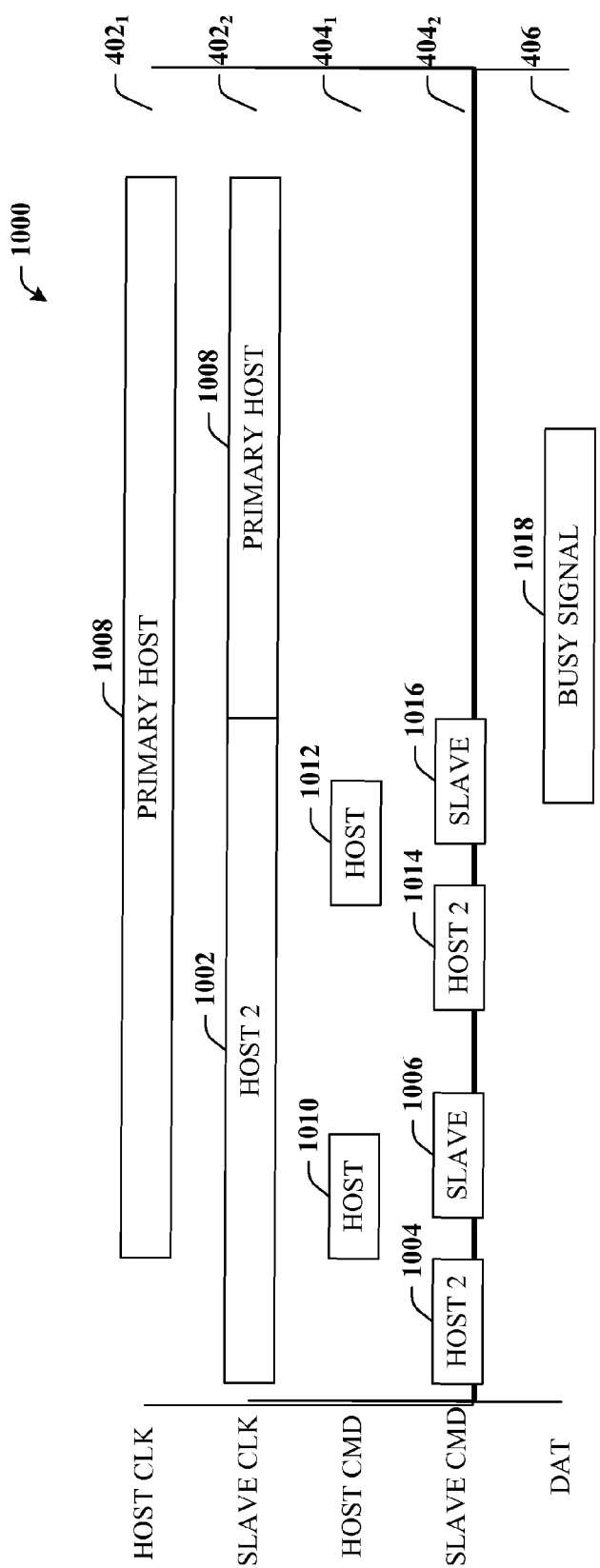
FIG. 10 is a block diagram illustrating an exemplary timing diagram with interleaving and busy signaling.

In FIG. 10 (while still referring to FIG. 4), an exemplary timing diagram 1000 with interleaving and busy signaling is depicted. Again, the case where the secondary host 412 initially has control of the CLK 402 and CMD 404 buses is considered. The primary host 412 directs the bit transfer as shown by block 1002 and issues a command 1004 to the slave 410 to which a response 1006 is received. The primary host 408 asserts the CLK $402_1$ (e.g. block 1008) and transmits command 1010. Since the secondary host 410 is conducting a transaction at that time, the signals from the primary host 408 can be ignored as before and it is assumed that the primary host 408 will send a retry command 1012.

If the first or second retry command 1012 (or even the initial command 1010) occurs during a secondary host 412/slave 410 transactions (e.g., 1004-1006 and 1014-1016), the secondary host 412 can determine whether a busy signal 1018 would be of use. In particular, the busy signal 1018 may be of use in extending the amount of time the slave 410 has before the primary host 408 takes further action (e.g., reset, power cycle, or reject the slave 410). The secondary host 412 can make this determination based upon a variety of factors such as the type of the transaction (e.g., a read, a write, an erase, etc.); the type of the standard employed (e.g., MMC, SD, or another standard); the length of time required to complete the transaction between the secondary host 412 and the slave 410, and the like.

For example, the secondary host 412 can examine the entirety or a subset of the features regarding all the relevant transactions, devices, standards, etc. and can provide for reasoning about or infer states of the system 400 from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, where the hypersurface attempts to split the triggering criteria from the non-triggering events. Intuitively, this makes the classification correct for testing data that is near, but not identical to training data. Other directed and undirected model classification approaches include, e.g. naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Still referring to FIGS. 4 and 10, it should be appreciated that in many cases, these timing limitations (e.g., maximums of about 250 ms and 100 ms) apply even when a busy signal (e.g., busy signal 1018) is asserted. Thus, the interleaving approach is a viable single solution for all cases. However, there also exist applications in which busy signal 1018 can be applied to increase functionality and/or flexibility of the systems described herein, which can include both portable and stationary applications applications/devices, as illustrated in FIG. 11.

Figure 11:
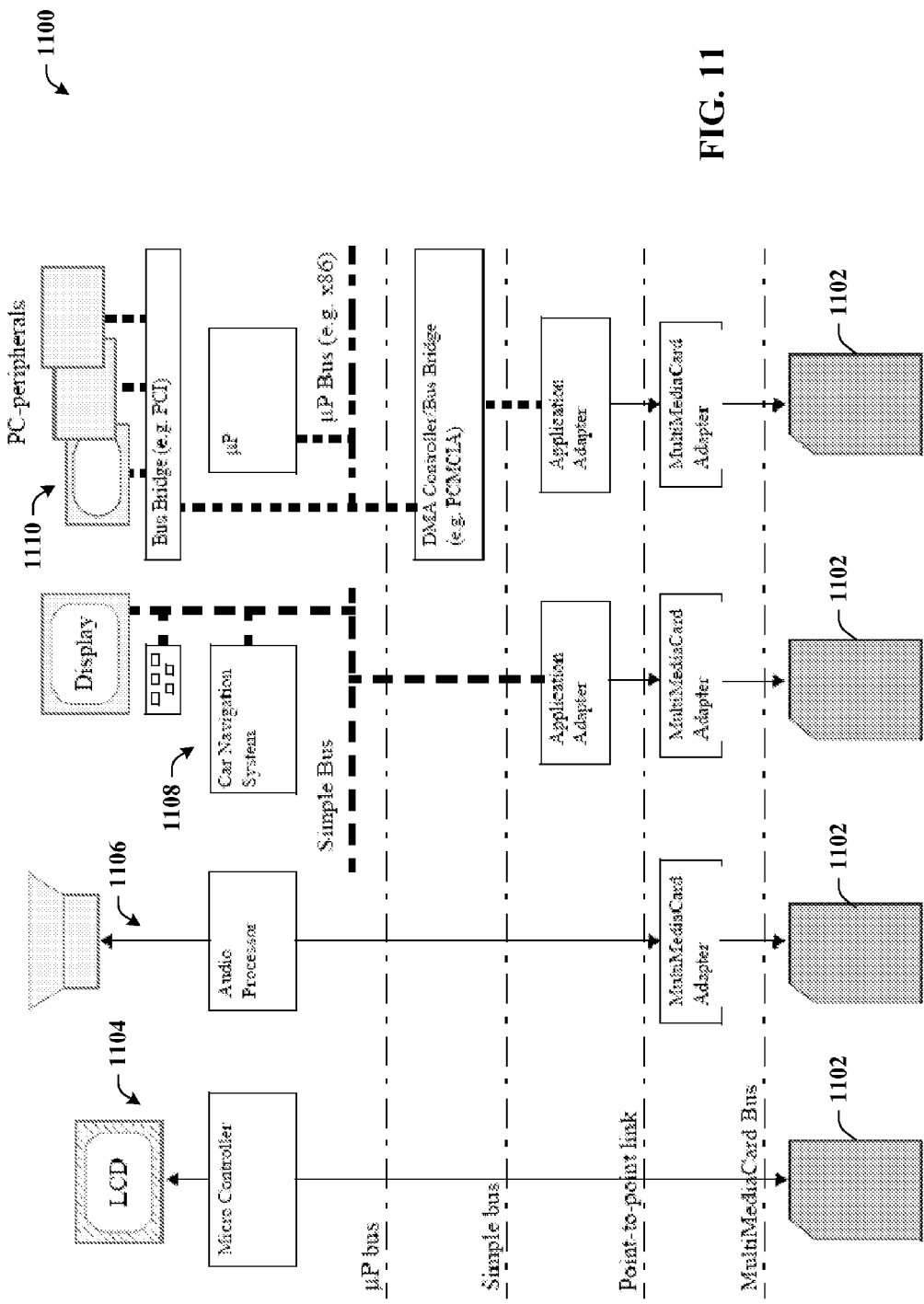
FIG. 11 is a block diagram of four typical architectures for use with common slave devices.

Turning now to FIG. 11, a block diagram 1100 of four typical architectures for use with common slave devices described herein is depicted. Generally, each architecture can include an interface to the slave 1102, which is typically a mass storage device such as a smartcard. The slave 1102 can conform to any form factor supported by one or more of the architectures, such as any form factor supported by MMC or SD modes.

A first architecture 1104 can include an LCD and a microcontroller (e.g., a primary host) that interfaces the slave 1102. A second architecture 1106 can include a speaker system, an audio controller (e.g., a primary host), and an MMC (or SD) Adapter that interfaces the slave 1102. A third architecture 1106 can include a display device, a primary host controller (e.g., a car navigation system in this case), an application adapter and an MMC (or SD) Adapter that interfaces the slave 1102. A fourth architecture 1110 can be a full-fledged PC (or similar computing device as will be detailed below) with all or many or all of the foregoing components as well as a DMA controller and an interface to the slave 1102.

Within any or all of these architectures (e.g., 1104-1110), a secondary host as detailed herein can be interfaced between the primary host and the slave 1102 without disturbing the normal relationship between the primary host and the slave 1102. The secondary host can be completely transparent to the primary host and no modifications to the primary host (e.g., hardware, software . . . ) are needed in order to support the secondary host. The secondary host can communicate with the slave 1102, employing the CLK and CMD buses only, as previously detailed. Moreover, the secondary host can also employ the command interleaving approach (as well as, in some cases the busy signaling approach) to effectively communicate with the slave 1102 during periods of primary host-slave 1102 communication without the need for complex and/or expensive multiplexing. In addition, the secondary host can adapt to the role of the slave 1102 and communicate directly with the primary host for additional features and functionality.

Figure 12:
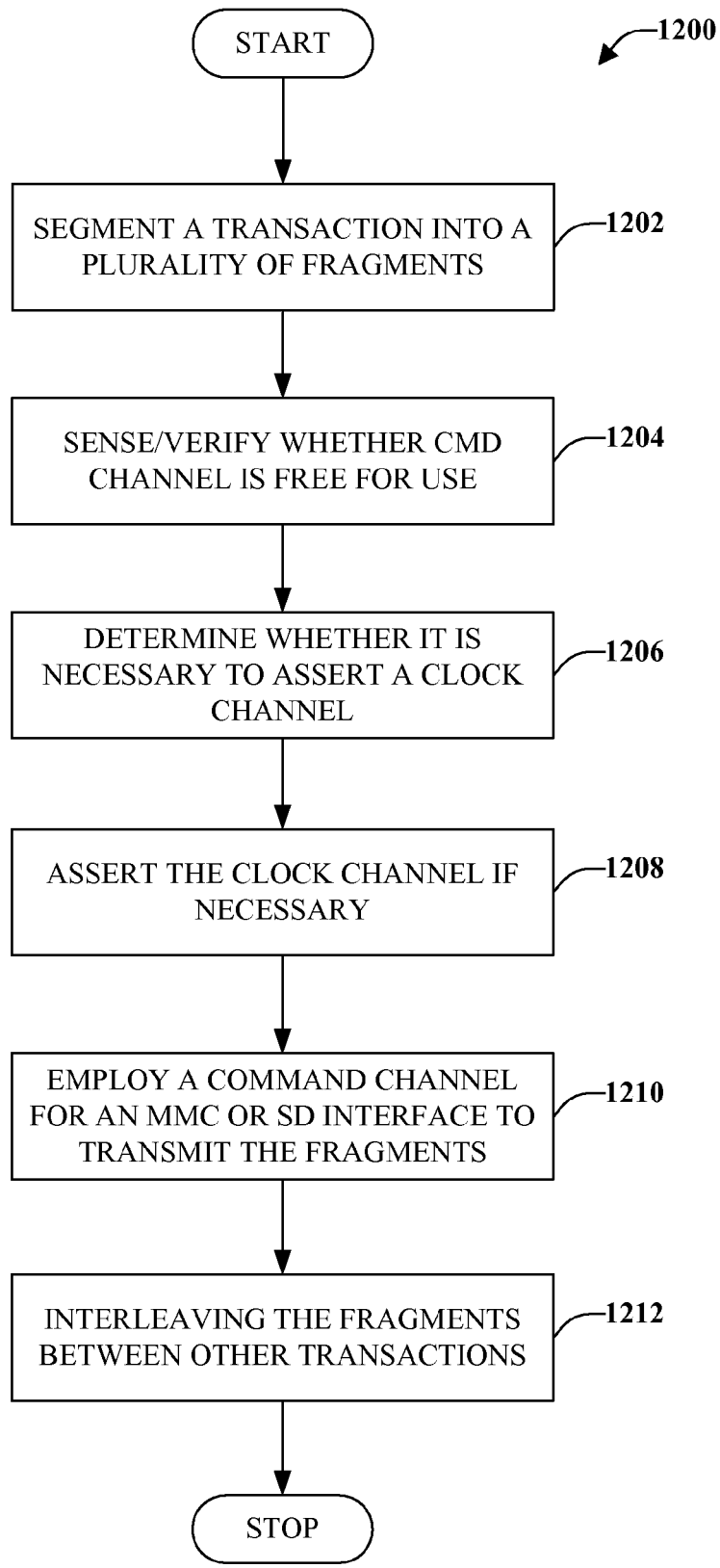
FIG. 12 illustrates a methodology for facilitating multiple communication channels on an MMC or SD CMD channel.

FIG. 12 illustrates a process flow diagram 1200. While, for purposes of simplicity of explanation, the one or more methods shown herein, e.g. in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

Turning now to FIG. 12, an exemplary computer implemented methodology 1200 for facilitating multiple communication channels on an MMC or SD CMD channel is illustrated. Generally, at 1202, a transaction between a secondary host (e.g., a controller that extends the functionality of a primary host such as a contactless controller) and a slave device (e.g., a smartcard such as a UICC) can be segmented into a plurality of fragments. Typically, each fragment can include an application specific command prefix as well as, e.g., 4 bytes of token information. The fragment need not be restricted to 4 bytes of token information, however, an interleaving approach is more effective when the token information is of a relatively small size. Hence, limiting the fragment to a small size such as 4 bytes enables the use of the standard MMC command format, where 4 bytes is the command argument size.

At 1204, the secondary host can verify that the CMD line is free for use to prevent contention; if used by the primary host, the secondary host can wait until the CMD line is free. At 1206, the secondary host can determine whether it is necessary to assert a clock channel for directing bit transfers between the secondary host and the slave. For example, if the CMD line is free for use, but the CLK line is being used to transmit data on the DAT line(s), the it may not be necessary to assert the CLK line to communicate along the CMD line. At 1208, the secondary host can assert the clock channel when it is determined (e.g., at act 1206) it is necessary to do so. It is likely to be the case that the secondary host will control the clock bus, however, it is also possible for the primary host to control the clock bus either partially or entirely during transactions between the secondary host and the slave. For example, the primary host can be driving the clock for its own transactions with the slave, such as when engaging in data transfers on the data channel. In such a case, it will not be necessary for the secondary host to power the clock line in order to make use of bit transfers on the command line. However, if the primary host completes the transaction and turns off the clock signal, the secondary host can determine this at act 1206 and assert its own control of the clock line at act 1208.

At 1210, the secondary host can employ the command channel of an interface (such as MMC or SD, etc.) to transmit the plurality of segments. Finally, at 1212, the secondary host can interleave these fragments in between on going transaction between the primary host and the slave that require the command line. According to an alternative aspect, the claimed subject matter can also make use of a busy signal on the DAT0 line of the data bus. In accordance therewith, the claimed subject matter can provide a multi-host solution for a slave device without any change to the primary host. Thus, many or all of the aforementioned features can be implemented on existing hardware without any modification to hardware, software, protocol, standards, firmware, etc. of the primary host.

Figure 13:
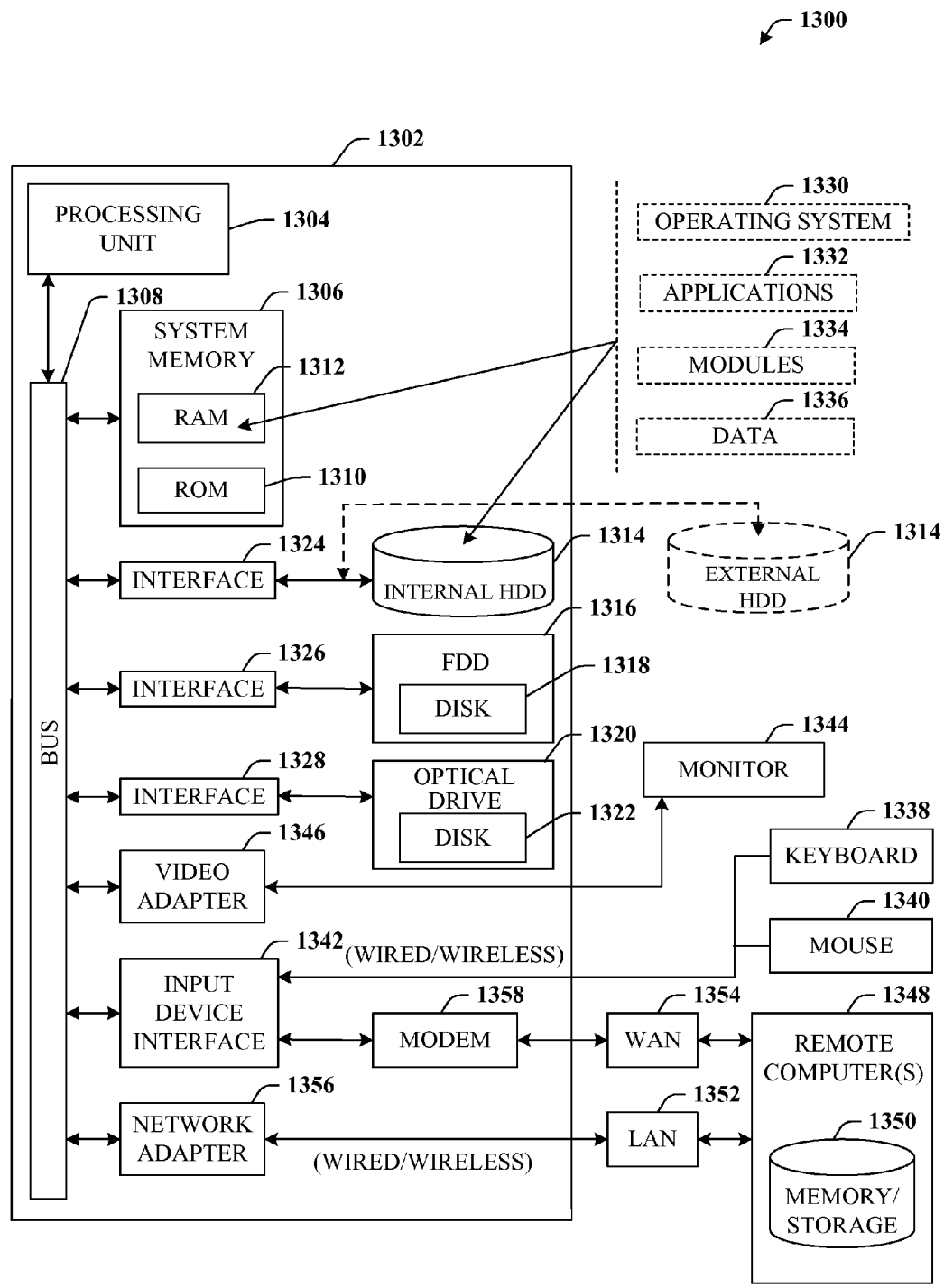
FIG. 13 illustrates a block diagram of a computer operable to execute the disclosed architecture.

Referring now to FIG. 13, there is illustrated a block diagram of an exemplary computer system operable to execute the disclosed architecture. In order to provide additional context for various aspects of the claimed subject matter, FIG. 13 and the following discussion are intended to provide a brief, general description of a suitable computing environment 1300 in which the various aspects of the claimed subject matter can be implemented. For example, various components of the systems and/or aspects thereof described supra can be implemented by way of the system 1300. Additionally, while the claimed subject matter has been described above in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the exemplary environment 1300 for implementing various aspects of the claimed subject matter includes a computer 1302, the computer 1302 including a processing unit 1304, a system memory 1306 and a system bus 1308. The system bus 1308 couples to system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a non-volatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1320 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1394 interface technologies. Other external drive connection technologies are within contemplation of the claimed subject matter.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the claimed subject matter can be implemented with various commercially available operating systems or combinations of operating systems.

A user can enter commands and information into the computer 1302 through one or more wired/wireless input devices, e.g. a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 via an interface, such as a video adapter 1346. In addition to the monitor 1344, a computer typically includes other peripheral output devices (not shown), such as speakers, printers, etc.

The computer 1302 may operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g. a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1302 is connected to the local network 1352 through a wired and/or wireless communication network interface or adapter 1356. The adapter 1356 may facilitate wired or wireless communication to the LAN 1352, which may also include a wireless access point disposed thereon for communicating with the wireless adapter 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 via the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 14:
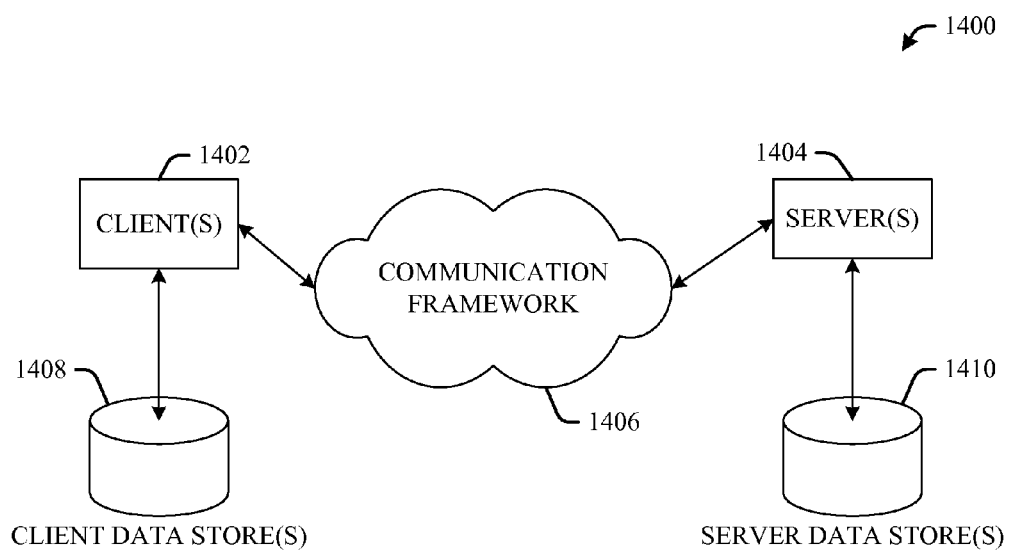
FIG. 14 illustrates a schematic block diagram of an exemplary computing environment.

Referring now to FIG. 14, there is illustrated a schematic block diagram of an exemplary computer compilation system operable to execute the disclosed architecture. The system 1400 includes one or more client(s) 1402. The client(s) 1402 can be hardware such as a digital camera with computer interface support and/or software (e.g., threads, processes, computing devices). The client(s) 1402 can house cookie(s) and/or associated contextual information by employing the claimed subject matter, for example.

The system 1400 also includes one or more server(s) 1404. The server(s) 1404 can also be hardware and/or software (e.g., threads, processes, computing devices). The servers 1404 can house threads to perform transformations by employing the claimed subject matter, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated via a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates multiple hosts for a slave device, comprising:
    an interface that facilitates transmission of a transaction between a primary host and a slave device, the interface includes a clock channel, a command channel and at least one data channel; and
    a secondary host operatively coupled to the interface, the secondary host manages the clock channel and the command channel for transactions that originate from the primary host and from the secondary host itself,
    the interface facilitates transmission of a second transaction between the secondary host and the slave device, wherein the secondary host divides the second transaction into a plurality of fragments and interleaves the plurality of fragments in a non-invasive manner between at least one transaction initiated by the primary host.

2. The system of claim 1, the interface conforms to at least one of the following standards: MMC and SD.

3. The system of claim 1, the secondary host mirrors signals on at least one of the clock channel and the command channel to facilitate the transaction between the primary host and the slave device.

4. The system of claim 1, the secondary host operates transparently to the primary host.

5. The system of claim 1, the second transaction includes information from a contactless device.

6. The system of claim 1, the command channel is utilized to transfer both commands and data for the second transaction.

7. The system of claim 1 each of the plurality of fragments is about 4 bytes in size.

8. The system of claim 1, the secondary host intercepts and drops signals on at least one of the clock channel and the command channel when the primary host attempts the transaction with the slave device.

9. The system of claim 8, the primary host retries the attempted transaction and the secondary host mirrors the corresponding signals to the slave device.

10. The system of claim 1, the secondary host asserts a busy signal on the at least one data channels when the primary host attempts a transaction with the slave device.

11. The system of claim 1, the primary host is at least one of a cellular phone, a digital camera, an organizer, a Personal Digital Assistants (PDA), a digital recorder, an MP3 player, a pager, an electronic toy, an electronic game, a scanner/reader, a computer, a computerized device, and a contactless device.

12. The system of claim 1, the slave device is at least one of a smartcard, a Subscriber Identity Module (SIM) card, a Universal Subscriber Identity Module (USIM), a Universal Integrated Circuit Card (UICC), a MultiMedia Card (MMC) card, a computer, a computerized device, a contactless device, and a Secure Digital (SD) card.

13. The system of claim 1, the secondary host is a contactless integrated circuit.

14. The system of claim 1, the secondary host simulates operation of the slave device to effectuate transactions between the primary host and the secondary host.

15. A computer-implemented method for facilitating multiple communication channels on an MMC or SD CMD channel, comprising:
    segmenting a transaction between a secondary host and a slave into a plurality of fragments, the fragments are interleaved between primary host transactions in a non-invasive manner;
    determining whether it is necessary to assert a clock channel for directing bit transfers between the secondary host and the slave;
    asserting the clock channel when the secondary host determines it is necessary; and
    employing a command channel of an interface conforming to an MMC or SD standard to transmit the plurality of fragments.

16. The method of claim 15, further comprising interleaving the fragments between transactions occurring on the command channel between the primary host and the slave.

17. A system for sharing an MMC or SD interface to a slave between a primary host and a secondary host with no modifications to the primary host, comprising:
    means for dividing data comprising a transaction between a secondary host and a slave into a plurality of sections;
    means for interleaving the plurality of segments between primary host transactions in a non-invasive manner;
    means for sensing whether the command channel is free for use;
    means for ascertaining whether it is required to activate a clock channel for controlling bit transfers between the secondary host and the slave;
    means for activating the clock channel when the secondary host ascertains it is required; and
    means for employing a command channel of an interface to convey the plurality of sections according to an interleaved approach.

* * * * *